United States Patent [19]

Sekiguchi

[11] Patent Number: 4,646,223
[45] Date of Patent: Feb. 24, 1987

[54] DRIVE CONTROL SYSTEM FOR ELECTRIC EQUIPMENT
[75] Inventor: Hiroshi Sekiguchi, Tokyo, Japan
[73] Assignee: Kanars Data Corporation, Japan
[21] Appl. No.: 613,519
[22] Filed: May 23, 1984
[30] Foreign Application Priority Data
  May 30, 1983 [JP] Japan .................................. 58-95573
[51] Int. Cl.$^4$ ........................................... G05B 19/00
[52] U.S. Cl. .................................... 364/130; 318/432
[58] Field of Search .................... 364/130; 328/72–75; 318/432, 433

Primary Examiner—Jerry Smith
Assistant Examiner—Allen MacDonald
Attorney, Agent, or Firm—Darby & Darby

[57] ABSTRACT

An electric equipment drive control system for controlling the drive of the electric equipment, wherein the drive control equipment includes a pulse signal generator for generating a pulse signal having the pulse signal corresponding to the voltage value at the power source, a microprocessor circuit which acts synchronously with the pulse signal outputted from the pulse signal generator and which executes a program prepared with a prerequisite that the voltage at the power source is a predetermined voltage, and a drive circuit for turning on and off the connection of each circuit in the electric equipment and the power source. The pulse signal generator increases the frequency of the pulse signal when the power voltage is higher than the predetermined voltage, and decreases the frequency of the pulse signal when the power voltage is lower than the predetermined voltage.

2 Claims, 6 Drawing Figures

DRIVE CONTROL SYSTEM FOR ELECTRIC EQUIPMENT

FIELD OF THE INVENTION

The invention relates to a drive control system for electric equipment.

BACKGROUND OF THE INVENTION

FIG. 1 shows an example of the conventional control system for controlling the electric equipment provided with step motors, a print hammer (hereinafter to be simply described as hammer), and the like using a microprocessor circuit. In this example, the control system is to control the step motor action and the hammer action for use in a printer. Reference numeral 1 in FIG. 1 is a plug to be connected with commercial AC power source. Reference numeral 2 is a power transformer to convert a commercial AC power voltage into the voltage for logic circuit or into the voltage for electric equipment drive. Reference numerals 3 and 4 are rectifiers, the former being used to convert an AC voltage for the logic circuit into a required direct current and the latter to convert an AC voltage for driving the electric equipment into a required voltage. The DC voltage thus converted through rectifier 3 is further stabilized by voltage stabilizing circuit 5, and reaches microprocessor circuit 6 and quartz oscillating circuit 7. On the other hand, the DC drive voltage for electric equipment thus converted through rectifier 4 is further stabilized by voltage stabilizing circuit 8, and then splits into two ways, one reaching drive circuit 10 for step motor 9 and the other reaching drive circuit 12 for hammer 11. Microprocessor 6 receives a pulse signal as a periodic clock signal output from quartz oscillator 7, is activated by this clock signal, and outputs a predetermined signal to drive circuits 10 and 12 to activate step motor 9 and hammer 11, respectively. Thus, the electric equipment drive control system of the prior art is provided with two voltage stabilizing circuits 5 and 8 to obtain a required voltage for the logic circuit and a required drive voltage for electric equipment. Therefore, if the power voltage inputted to power transformer 2 via plug 1 varies, quartz oscillator 7, microprocessor circuit 6, and the electric equipment (step motor 9, and hammer 11) act normally.

In general, the power circuit for direct current stabilizing is of two types, a dropper type and a switching type. The former requires a voltage transformer equipped with a radiator, thereby radiating waste energy and resulting in low energy efficiency. The latter is superior in energy efficiency but it is likely to generate noise and is expensive due to the complexity of its circuit. In any case, such direct current stabilizing circuits are costly and energy inefficient. If such voltage stabilizing circuits are removed, the power voltage which has been changed in applied directly to the electric equipment circuit. Moreover, the microprocessor circuit is designed, based on a prescribed voltage value, to calculate a lapse of time throughout which power is applied to each circuit of the electric equipment. In consequence, if the power voltage is small, that is, if the electric equipment is the step motor, for example, it may reduce the torque of the motor, which in turn may cause, the step motor to malfunction, and if the electric equipment is the printer hammer, it may cause the printed character to be too thin. On the other hand, if the power voltage is large, the electric equipment carries out unnecessarily excessive work, resulting in consumption of excessive and wasted energy.

SUMMARY OF THE INVENTION

An object of the invention is to provide an electric equipment drive control system that maintains the stable operation of the electric equipment without using a voltage stabilizing circuit.

The equipment drive control system of the present invention comprises a pulse signal generator for generating a pulse signal having the frequency corresponding to the value of the power voltage, a microprocessor circuit that operates synchronously with the pulse signal outputted from this pulse signal generator as a clock signal to execute the program prepared assuming the power voltage to be a predetermined voltage, and a drive circuit that connects and disconnects each circuit of the electric equipment and power source based on the timing and time interval determined by the microprocessor. This system is designed to apply electric current for a short time to each circuit of the electric equipment when the power voltage is high and to apply electric current for a long time to each circuit thereof when the power voltage is low.

According to the invention, the electric equipment can be operated stably without stabilizing the power voltage for driving the electric equipment.

Other objects, operational effects, and details of the invention will be apparent from the foregoing description found by referring to the accompanying drawings of the embodiments of the invention.

DESCRIPTION OF THE PREFERRED EMBODIMENTS

Figure 2:
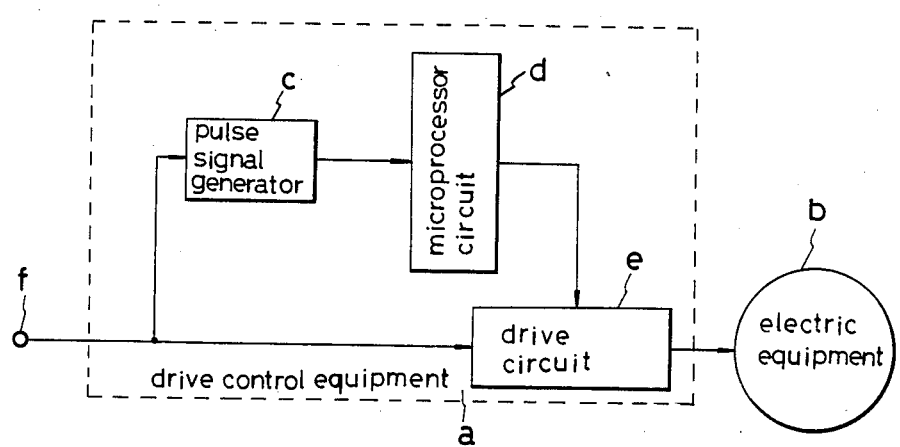
FIG. 2 is a block diagram showing the construction of the invention.

Next, referring to the drawings an embodiment according to the present invention will be described in detail. FIG. 2 is a block diagram showing the construction of an entire system of the invention. Section a enclosed with a dotted line in FIG. 2 is a drive control equipment that controls driving of electric equipment b. Drive control equipment b comprises pulse signal generator c, microprocessor circuit d, and drive circuit e. The power voltage to be supplied from terminal f is designed to reach drive circuit e and pulse signal generator c. Pulse signal generator c outputs a high-frequency pulse signal when the power voltage on terminal f is high and outputs a low-frequency pulse signal when the power voltage is low. Microprocessor circuit d receives this pulse signal as a clock signal, executes the program prepared assuming the power voltage to be a predetermined voltage, and determines the timing and the time interval for operating drive circuit e. Drive circuit e connects and disconnects each circuit of electric equipment b and the power source in accordance with the timing and the time interval determined by microprocessor circuit d.

Figure 3:
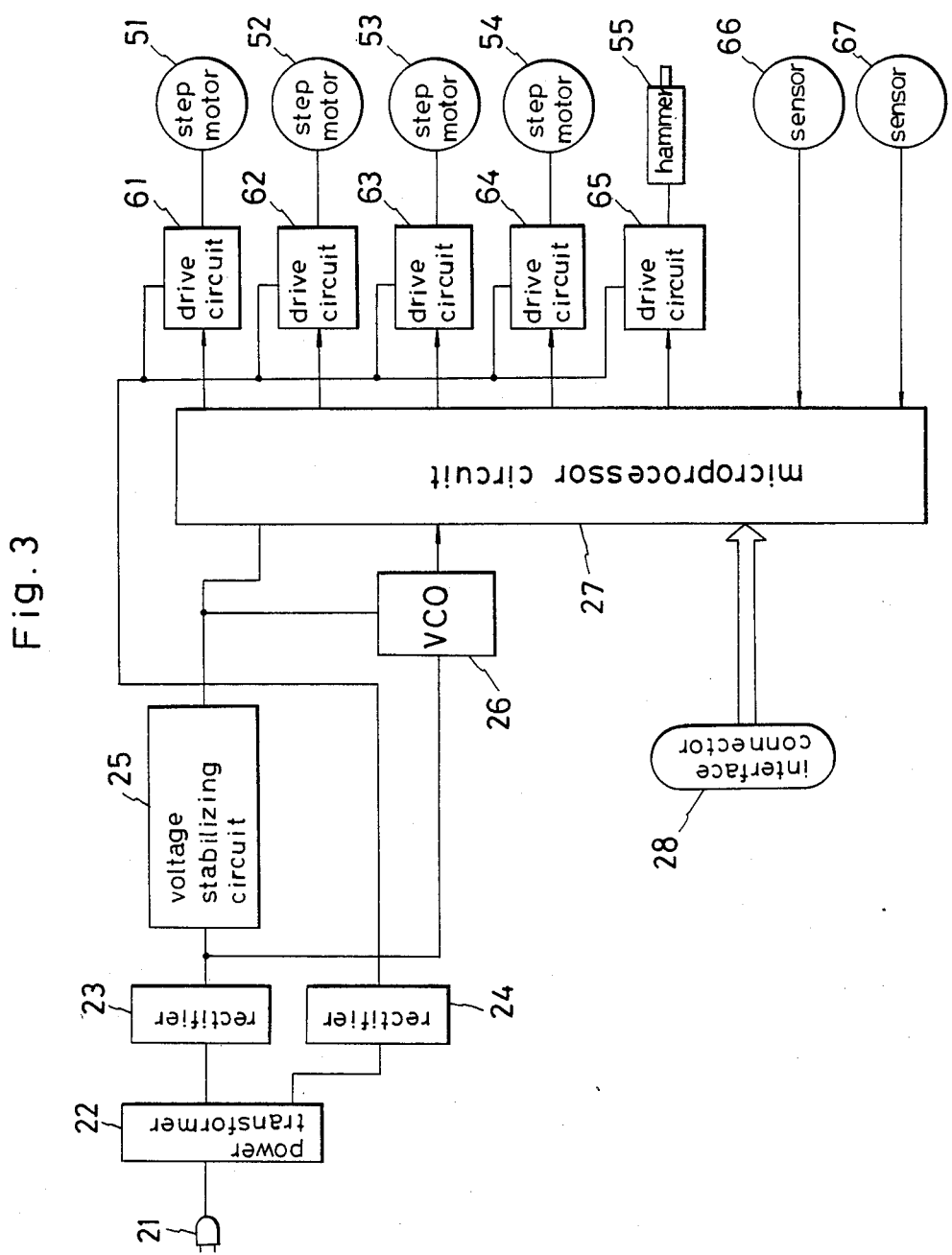
FIG. 3 is electric block diagram showing an example of an electric equipment drive control system of the invention.

The following more concretely describes an embodiment of the invention by reference to FIG. 3.

In the embodiment shown in FIG. 3, the electric equipment is a printer, and the pulse signal generator is a voltage sensing type oscillating circuit.

Reference numeral 21 in FIG. 3 is a plug for connecting the equipment to a source of commercial AC power (AC 100 V in Japan). Reference numeral 22 is a power transform to transformer the commercial power voltage into a logic circuit voltage and the electric equipment drive voltage. Reference numerals 23 and 24 are rectifiers to convert the AC voltage for the logic circuit and the AC voltage for driving the electric equipment into DC voltages, respectively. Voltage stabilizing circuit 25 is connected to rectifier 23 and operates to stabilize the DC voltage converted through rectifier 23.

Reference numeral 26 is a voltage sensing type oscillating circuit (hereinafter referred to as a VCO). VCO 26 is designed so that the output voltage (unstabilized voltage) from rectifier 23 is to be inputted thereto, and when this voltage changes, the pulse signal having a frequency corresponding to this amount of change is output to microprocessor circuit 27. That is, VCO 26 outputs a pulse signal having a frequency higher than a predetermined frequency to the clock terminal of the microprocessor circuit 27 when the output voltage from rectifier 23 is higher than a predetermined voltage (which preferably is set at 5 V), and when the output voltage therefrom is lower than the predetermined voltage, the VCO 26 outputs a pulse signal whose frequency is lower than the predetermined frequency thereto. On the other hand, a voltage of 5 V stabilized by voltage stabilizing circuit 25 is used as the power voltage for operating microprocessor circuit 27 and VCO 26 stably, respectively. Moreover, as the purpose of voltage stabilizing circuit 25 used herein is for obtaining such stabilized voltage for the logic circuit, the power consumed by the voltage stabilizing circuit is small in comparison to that of the voltage stabilizing circuit for driving the electric equipment.

Figure 4:
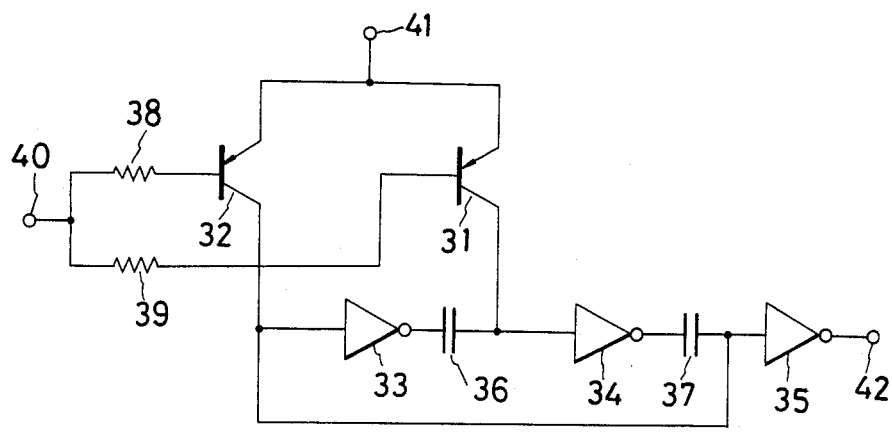
FIG. 4 is a circuit diagram showing an example of the VCO used in an electric equipment of the invention.

FIG. 4 shows an example of the circuit for VCO 26. The circuit shown in this example comprises two PNP transistors 31 and 32, three inverters 33, 34, and 35, two capacitors 36 and 37, and two resistors 38 and 39. When a constant voltage (5 V) is applied to input terminal 40 of this circuit from voltage stabilizing circuit 25 and the output voltage (unstabilized voltage) from rectifier 23 is applied to input terminal 41, a pulse signal having a frequency corresponding the outputted voltage from this rectifier 23 is output from output terminal 42 and this pulse signal is inputted to the aforementioned clock terminal of microprocessor 27.

The printer of the embodiment shown in FIG. 3 is a daisy wheel type printer having four step motors (step motor 51 for driving the daisy wheel, step motor 52 for rewinding a ribbon, step motor 53 for moving the carriage, and step motor 54 for driving the paper feed mechanism), one hammer 55, and drive circuits 61 through 65 for driving step motor 51 through 54 and hammer 55, respectively. These drive circuits 61 through 65 are designed so that the output voltage from rectifier 24 can directly be applied thereto, and that the control signal to be output from microprocessor circuit 27 can be inputted to individual drive circuits 61 through 65.

Reference numeral 66 in FIG. 3 is a sensor to detect the home position for the daisy wheel, and reference numeral 67 a sensor to detect the home position for the carriage. The signals detected of sensors 66 and 67 are designed to be supplied to microprocessor 27. Further, reference numeral 28 is an interface connector provided for taking the print data and the like to be supplied from a host computer (not shown) to microprocessor 27. Furthermore, the drive control equipment comprises the aforementioned VCO 26, microprocessor circuit 27, and drive circuits 61 through 65.

Figure 1:
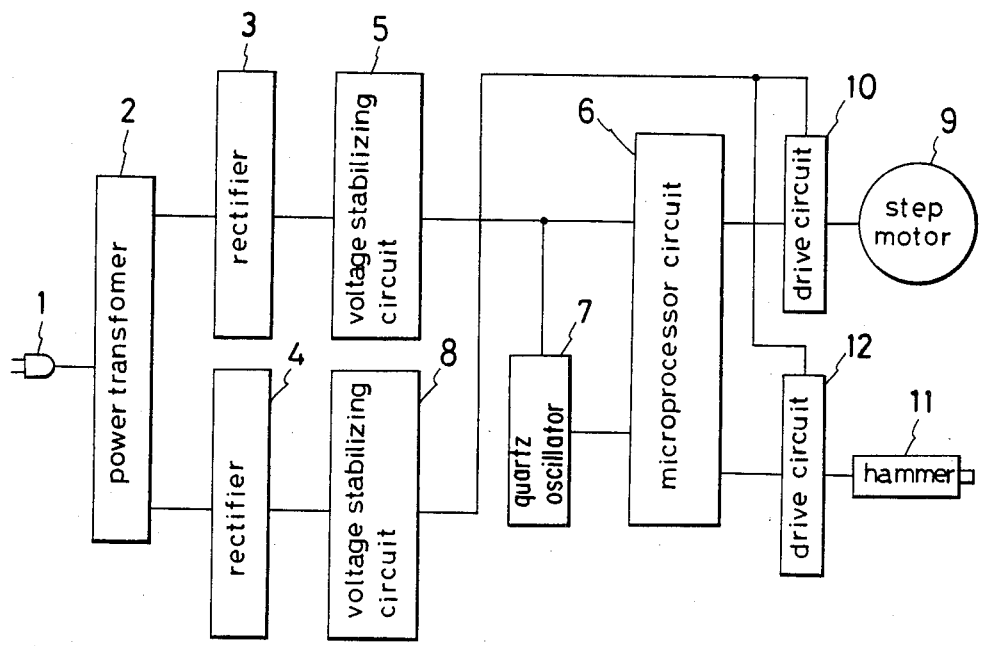
FIG. 1 is an electric block diagram showing an example of an electric equipment drive control system of the prior art.

In the embodiment of the invention shown in FIG. 3, when plug 21 is connected to the commercial AC power source, the printer starts its print operation. If the commercial AC power source reaches a predetermined voltage and is kept constant, it is of course unnecessary to stabilize the power voltage, and as VCO 26 is designed to output a pulse signal having the same frequency as that of the quartz oscillating circuit 7 shown in FIG. 1, this printer operates exactly the same way as a conventional printer. That is, microprocessor circuit 27 detects the home position for the daisy wheel by using sensor 66, detects the home position for the carriage by using sensor 67, carries out the initial print settings on the basis of the detected home positions, drives each of step motors 51 through 54 on the basis of print data to be supplied from the host computer via the interface connector 28, and activates hammer 55 to print data.

The operation the system of the present invention, under the condition that the commercial AC power source varies, will now be described.

When the commercial AC power source varies, such variation usually being in the range of between 90 and 110 volts, the output voltages from the two individual rectifiers 23 and 24 also vary. The output voltage from rectifier 23 is distributed to voltage stabilizing circuit 25 and to VCO 26. The output voltage from voltage stabilizing circuit 25 becomes the power voltage to microprocessor circuit 27 and VCO 26 to provide a stable source of power to VCO 26 and microprocessor 27. On the other hand, the output voltage from rectifier 24 is directly applied to drive circuits 61 through 65. Thus, the assumption is made that the output voltage from rectifier 24, for example, varies in range from 22 V to 26 V in such condition as stated above.

Figure 5:
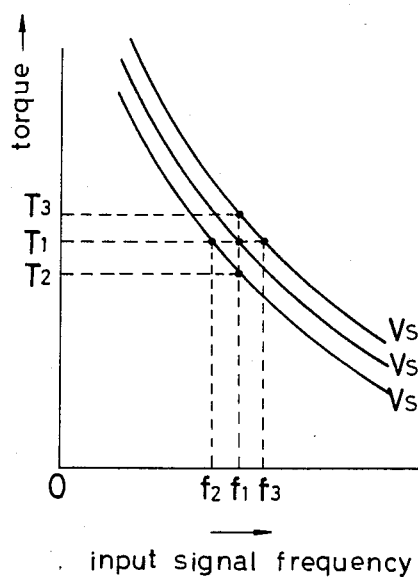
FIG. 5 and FIG. 6 are characteristic diagrams for explaining the action of an electric equipment of the invention.

FIG. 5 shows general relationships between the torque of a step motor and the input signal frequency (Pulse per second) for different input voltages (22 V, 24 V, and 26). As FIG. 5 shows, to obtain constant torque $T_1$ at a constant frequency $T_1$, the input voltage $Vs=24$ (V) is satisfactory. However, if input voltage Vs is 22 (V), torque T becomes $T_2$ which is so small that the step motor may not be able to drive its respective printer component properly. To avoid this problem, conventional methods employ a stabilizing circuit to supply the drive circuit with a constant voltage, for example, 24 volts. The drive control system of the present invention does not use a stabilizing circuit like conventional systems, but rather applies such means that when input voltage Vs to step motors 51 through 54 is too low (Vs=22 V), the input signal frequency f is accordingly decreased to a lower frequency ($f_2$), and that when the input voltage Vs is too high (Vs=26 V), the input signal frequency f is accordingly increased to a higher frequency ($f_3$), thus enabling the system to achieve a constant torque of $T_1$.

VCO 26 and the microprocessor circuit 27, which acts in synchronism with the pulse signal (i.e., the clock signal outputted from VCO 26), function to regulate the input signal frequency. That is, VCO 26 outputs a pulse signal with a higher frequency when the output voltage from rectifier 23 (or the output voltage from rectifier 24) is higher than a prescribed voltage (for example, 24 V), and outputs a pulse signal with a lower frequency when the output voltage is lower than the prescribed voltage. Microprocessor circuit 27 receives the pulse signal from the VCO 26 on the microprocessor clock input terminal, and executes a predetermined program. The predetermined program provided herein is a program which is prepared assuming that the voltage for driving step motors 51 through 54 is 24 V. As the frequency of the clock pulse signal is high when this drive voltage is greater than 24 V, microprocessor circuit 27 outputs a pulse signal with a higher frequency to drive circuits 61 through 64 corresponding to individual step motors 51 through 54. Alternatively, when the drive voltage is lower than 24 V, the frequency of the clock pulse signal is lower, thereby enabling microprocessor circuit 27 to send a pulse signal with a lower frequency to drive circuits 61 through 64 for individual step motors 51 through 54. In this way, a constant voltage is provided, each of step motors 51 through 54.

Figure 6:
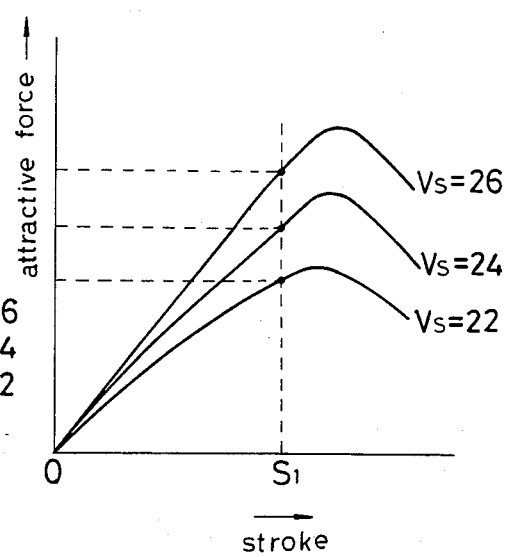

FIG. 6 shows the relationship between the attractive force of the hammer solenoid and the stroke thereof for each of input voltage Vs=22 (V), Vs=24 (V), and Vs=26 (V). As FIG. 6 shows, attractive force F increases as input voltage Vs increases for a constant stroke of $S_1$. Therefore, one method of having the hammer perform a predetermined amount of work is to continue to apply a current to the hammer solenoid for a short interval when input voltage Vs is higher, and to continue to apply a current to the hammer solenoid for a long interval when the input voltage is lower.

As is similar to the case of driving the aforementioned pulse motors 51 through 54, the drive control system of the invention is designed to have the VCO 26 and the microprocessor 27, which acts synchronously with the pulse signal of the clock pulse output from VCO 26, perform a time interval adjustment. That is, as the frequency of the clock signal is hish, such as when the drive voltage is grreater than 24 V, microprocessor 27 outputs a control signal with a short duty cycle to the drive circuit 65 which controls hammer 55 in order to turn on drive circuit 65. On the other hand, when the drive voltage is lower than 24 V, for example, the frequency of the clock signal is also low, whereby microprocessor 27 outputs a control signal with a long duty cycle to the drive circuit 65 which controls hammer 55 in order to turn on the drive circuit 65. Thus, the hammer 55 is able to carry out printing with a precise pressure.

Also, when the frequency of the clock signal varies as aforementioned, it does not affect the processing of print data (to be supplied from the host computer to the interface connector 28), for all the actions within microprocessor 27 are executed fast or slowly proportionally as the frequency of the clock signal increases or decreases.

Further, it is usual that a voltage stabilizing circuit for driving the electric equipment is used for stabilizing not only the voltage variation (i.e., the input variation) of the commercial AC power source, but also the voltage variation i.e., the (load variation) caused by the operating condition of the electric equipment. However, as the load variation in the printer and like equipment provided in this embodiment can all be predicted, it is usual to deal with such load variations using a microprocessor. Therefore, the invention is particularly effective for controlling equipment whose load variation can be predicted and controlled in such manner as described above.

Furthermore, the invention is also very useful for the electric equipment which is driven by a battery, such as portable equipment, because the load variation can be controlled in accordance with the voltage variation of the battery.

As described so far, according to the invention an electric equipment drive control system can be implemented without using a power voltage stabilizing circuit for driving the electric equipment. Therefore, the equipment provided with the drive control system of the present invention consumes less electric power, dissipates less heat, is lighter in weight, and can be manufactured at a lower cost than conventional equipment control circuits.

REFERENCE NUMERALS AND CHARACTERS

FIG. 1

2: Power transformer
3: Rectifier
4: Rectifier
5: Voltage stabilizing circuit
6: Microprocessor circuit
7: Quartz oscillating circuit
8: Voltage stabilizing circuit
9: Step motor
10: Drive circuit
11: Hammer

FIG. 2

12: Drive circuit
a: Drive control equipment
b: Electric equipment
c: Pulse signal generator
d: Microprocessor circuit
e: Drive circuit
f: Power source

FIG. 3

22: Power transformer
23: Rectifier
24: Rectifier
25: Voltage stabilizing circuit
26: VCO
27: Microprocessor circuit
28: Interface connector
51 through 54: Step motors
55: Hammer
61 through 65: Drive circuits

FIG. 4

FIG. 5

Torque T
Input signal frequency f

FIG. 6

Attractive force F
Stroke S

What is claimed is:

1. An electric equipment drive control system comprising an electric equipment and a drive control equipment for controlling the drive of the electric equipment by using a microcomputer, wherein said drive control equipment is provided with a pulse signal generator for generating a pulse signal having a predetermined frequency when the power voltage at said electric equipment presents a predetermined voltage, for generating a pulse signal having a higher frequency when said power voltage is higher than said predetermined voltage, and for generating a pulse signal having a lower frequency when said power voltage is lower than said predetermined voltage, wherein said drive control equipment is provided with a microcomputer for receiving the pulse signal as clock signal output from said pulse signal generator, for executing a program prepared with a prerequisite that the voltage at said power source is said predetermined voltage, and for determining the timing and time interval to apply a current to each circuit in said electric equipment, and wherein said drive control equipment is provided with a drive circuit for turning on and off the connection of each circuit in said electric equipment and said power source on the basis of the timing and time interval determined by the microprocessor.

2. An electric equipment drive control system as claimed in claim 1, wherein said electric equipment is the printing equipment.

* * * * *